United States Patent
Truong et al.

(10) Patent No.: US 12,524,665 B2
(45) Date of Patent: Jan. 13, 2026

(54) TOKEN SYNTHESIS FOR MACHINE LEARNING MODELS

(71) Applicant: Capital One Services, LLC, McLean, VA (US)

(72) Inventors: Anh Truong, Champaign, IL (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 784 days.

(21) Appl. No.: 17/849,391

(22) Filed: Jun. 24, 2022

(65) Prior Publication Data
US 2023/0419102 A1 Dec. 28, 2023

(51) Int. Cl.
*G06N 3/08* (2023.01)

(52) U.S. Cl.
CPC ...................... *G06N 3/08* (2013.01)

(58) Field of Classification Search
CPC .......... G06N 3/045; G06N 3/044; G06N 3/08; G06N 3/084; G06N 20/00; G06N 3/0455; G06N 3/047; G06N 3/088; G06N 5/02; G06N 20/20; G06N 5/01; G06N 5/046; G06N 7/01; G06N 3/006; G06N 3/042; G06N 3/126; G06N 3/04; G06N 3/0464; G06N 3/09; G06N 3/0442; G06N 3/048; G06N 3/096; G06N 3/0475; G06N 3/082; G06N 3/092; G06N 3/0985; G06N 5/04; G06N 3/0895; G06N 3/094; G06N 3/098; G06N 5/025; G06N 5/045
See application file for complete search history.

(56) References Cited

U.S. PATENT DOCUMENTS 11,538,467 B1 * 12/2022 Feyisetan ................ G06F 40/30

OTHER PUBLICATIONS

"Detecting potential labeling errors in microarrays by data perturbation" Malossini et al Department of Information and Communication Technology, University of Trento, 38050 Povo, Italy and Department of Computer Science, University of British Columbia, Vancouver, BC V6T1Z4, Canada (Year: 2006).*

* cited by examiner

*Primary Examiner* — Luis A Sitiriche
(74) *Attorney, Agent, or Firm* — Foley & Lardner LLP

(57) ABSTRACT

A method includes generating a first vector associated with a token using a first set of parameters of a first learning model based on the token, determining a prediction indicating that the token is associated with a first label based on a set of clustering criteria, the first vector, vectors of a first vector set, and vectors of a second vector. The method includes generating a perturbed vector associated with a second label by modifying a value of the first vector and updating the second vector set to comprise the perturbed vector. The method also includes generating a synthesized token associated with the second vector set based on the perturbed vector using a second set of parameters of the first learning model and training a second learning model based on the synthesized token.

20 Claims, 3 Drawing Sheets

TOKEN SYNTHESIS FOR MACHINE LEARNING MODELS

BACKGROUND

The frequency by which different forms, emails, or other methods of communication require the disclosure of information from a user may confuse the user into disclosing user-identifying information that is not necessary for disclosure. Furthermore, various machine learning optimization operations or data science operations may require removing user-identifying information or other sensitive information. The field of natural language processing may provide techniques to help efficiently identify such private information. Such techniques may be robust with respect to different types of user-identifying information or different information formats.

SUMMARY

Various user-facing operations and internal operations may include analyzing data from real-world users. However, privacy concerns and cybersecurity concerns may hamper efforts to accurately analyze sensitive data, such as email addresses, phone numbers, names, or other types of user-identifying information. Some embodiments may use one or more rules-based systems to detect user-identifying information in many cases. However, the evolving definitions for sensitive data and the different formats associated with sensitive information may prevent rigid rules-based systems from accurately capturing sensitive information. For example, some embodiments may include a rule to capture email addresses based on a regular expression pattern. However, an email address may be overlooked by a rule if an email address does not match the rule's regular expression pattern due to a misspelling or a variation in an email server. Some embodiments may overcome these limitations by replacing or augmenting a rule-based system with a neural network model or another machine learning model to capture sensitive information better. However, learning models are often limited by their training set. The low frequency of non-standard sensitive data in training sets and many possible variations in how sensitive data may be presented increase the difficulty of presenting an accurate training set to a learning model. These inaccurate training sets may result in either an overabundance of false indications that sensitive information is not sensitive or false indications that non-sensitive information is sensitive. Furthermore, even if a model is trained to label a particular token as sensitive data, minor variations in the characters or format of the particular token may cause the trained model to label other sensitive data as non-sensitive data.

After detecting that a machine learning model has failed to categorize a sensitive token as sensitive data accurately, some embodiments may synthesize additional tokens based on the sensitive token and retrain a learning model using the synthesized tokens. For example, a system may obtain a prediction for one or more labels associated with a candidate token providing a neural network with the candidate token as an input. Some embodiments may determine, for example, that the candidate token is associated with a sensitive data label based on an output of the neural network, where a sensitive data label and "sensitive data" label may be used interchangeably in this disclosure, and where the sensitive data label may indicate that a token or other type of data is sensitive. Furthermore, some embodiments may encode the candidate token to determine a first vector representing an embedding in a latent space by providing a set of encoder layers of an autoencoder with the candidate token. Some embodiments may then determine whether the first vector is associated with a cluster using a set of clustering criteria. The cluster may represent a cluster of vectors associated with a sensitive data label. Some embodiments may then determine that the first vector is not associated with the cluster of vectors and should not be associated with the sensitive data label. Some embodiments may determine that the candidate token is associated with a sensitive data label and that the association with the non-sensitive data label by a machine learning model is an erroneous association. As described below, some embodiments may synthesize training tokens based on these erroneous associations to increase the robustness of a training operation and increase the possibility of accurately detecting future forms of sensitive data.

Based on a determination that a clustering-based prediction does not match the sensitive data label, some embodiments may first update the cluster to indicate that the first vector is a part of the cluster or generate a new cluster associated with the sensitive data label, where the new cluster includes the first vector. Furthermore, some embodiments may synthesize a set of perturbed vectors based on the first vector, where synthesizing the set of perturbed vectors may include randomly selecting one or more values of the first vector and offsetting the selected values by a random threshold-restricted asset. Some embodiments may then associate each of these perturbed vectors with the sensitive data label and use the set of decoder layers of the autoencoder to generate a set of synthesized tokens representing additional sensitive data. Some embodiments may then retrain the neural network based on the set of perturbed tokens, where the retrained neural network will associate the candidate token with the sensitive data label after the retraining operation. Once retrained, the neural network or other trained machine learning model may have a higher likelihood of accurately detecting sensitive data even if the sensitive data is provided in a previously unseen form.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
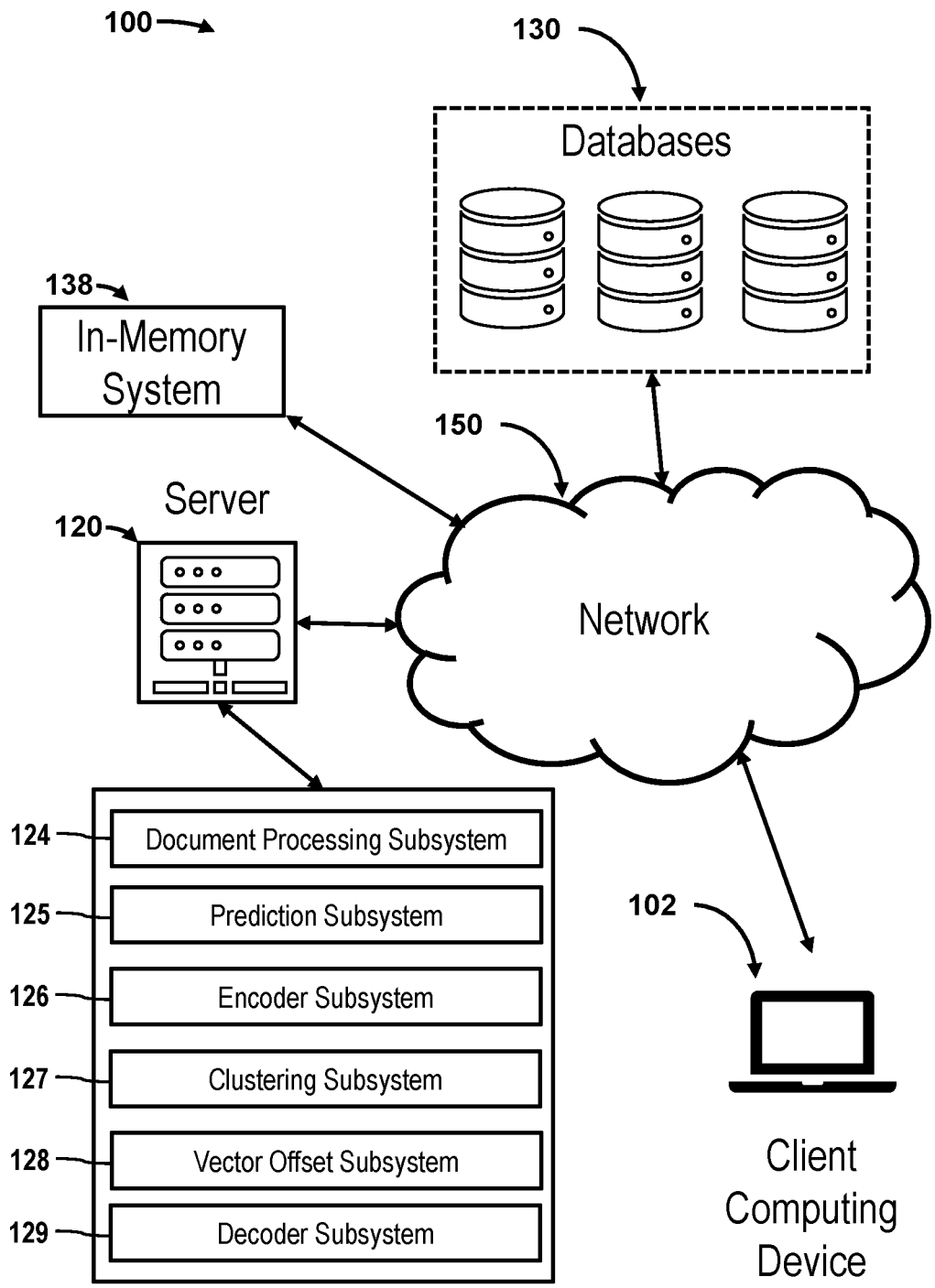
FIG. 1 shows an illustrative system for synthesizing tokens and training a machine learning model based on the synthesized tokens, in accordance with one or more embodiments.

FIG. 1 shows an illustrative system for synthesizing tokens and training a machine learning model based on the synthesized tokens, in accordance with one or more embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage media storing program instructions to perform one or more operations of subsystems 124-129. While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, although some embodiments are described herein with respect to machine learning models, other types of models (e.g., a probabilistic model) may be used instead of or in addition to the machine learning models. For example, a probabilistic model may be used to replace a neural network model in one or more embodiments to determine embedding vectors based on tokens or tokens based on embedding vectors. Furthermore, some embodiments may communicate with an API of a third-party data service via the network 150 to perform a learning model training operation, obtain machine learning model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include various values used to perform operations described in this disclosure, such as documents, text preprocessing parameters, machine learning training data, learning model parameters, embedding vectors and associated latent space parameters, labels and records associated with labels, etc. For example, records of the set of databases 130 may include documents, tokens generated from the documents, labels associated with the tokens, vectors generated from the tokens and associated with the labels, perturbed vectors, etc. In addition, the client computing device 102 or the server 120 may access data stored in an in-memory system 138, where the in-memory system may include an in-memory data store that stores data in a key-value data store such as Redis™. Some embodiments may store learning model parameters, learning model results, or other data in an in-memory data store to accelerate data retrieval or learning model operations.

Subsystems 124-129

In some embodiments, document processing subsystem 124 may obtain a document and convert the document into a set of tokens via preprocessing operations. For example, the document processing subsystem 124 may obtain a document in the form of an email, a text search entry, a submitted body of text in an ongoing form, etc. Some embodiments perform preprocessing operations such as lemmatization, stop word removal, sub-word determination, etc. to determine a sequence of tokens, where each token may include a word, a sub-word, a number, etc.

In some embodiments, the prediction subsystem 125 may use a set of machine learning models to determine whether a candidate token or set of tokens includes sensitive information. For example, some embodiments may provide the candidate token "p496re325gk@egrf85aj76.c95" to a convolutional neural network to determine whether the candidate token is sensitive or not sensitive data. Based on an output of the convolutional neural network, some embodiments may determine that the output indicates that the candidate token is sensitive data and label the candidate token with the data label "sensitive data." While some embodiments may use a machine learning model to determine whether a candidate token includes sensitive data, some embodiments may use a machine learning model to perform other types of predictions or categorization operations based on tokens. For example, some embodiments use a machine learning model to label whether a token or token sequence is suspicious or associated with fraud. Furthermore, some embodiments may use a machine learning model to associate multiple labels to a token or sequence of tokens.

As described elsewhere in this disclosure, some embodiments may train a machine learning model. For example, some embodiments may obtain training data from the set of databases 130 to train a machine learning model of the prediction subsystem 125. Furthermore, after obtaining one or more synthesized tokens and their associated labels, some embodiments may retrain the machine learning model based on the synthesized tokens and their associated labels. As used in this disclosure, associating a token or other item with a label may include various operations that indicate that the item is of a category represented by the label. For example, some embodiments may associate an item with a label by updating a state value of the item, updating a list of items categorized with the label, updating index values representing items of the label, etc.

In some embodiments, an encoder subsystem 126 may use a set of encoder layers to encode the candidate token into an embedding vector by providing the encoder layers with the candidate token as an input. For example, the candidate token "p496re325gk@egrf85aj76.c95" may be provided to a set of encoder layers of an autoencoder to generate the five-dimensional embedding vector "[0.53, 0.99, 0.71, 0.32, 0.45]." Other embodiments may generate embedding vectors that have more than two dimensions, more than five dimensions, more than ten dimensions, more than 100 dimensions, more than 1000 dimensions, or some other number of dimensions, etc. The autoencoder may be trained to assign different vectors based on different tokens, where each vector may be in a latent space. Some embodiments may determine the dimensions and boundaries of the latent space based on a corpus of documents, where the dimensions of the latent space may be less than the total number of tokens of the corpora.

In some embodiments, a clustering subsystem 127 may determine clusters of embedding vectors and associate clusters with labels. The clustering subsystem 127 may assign each vector generated by the encoder layers into a cluster based on distances between vectors in the latent space (e.g., by using one or more clustering algorithms). For example, some embodiments may generate a set of 1000 embedding vectors based on a set of 1000 candidate tokens and then use a density-based clustering method to determine two clusters based on the set of embedding vectors. Some embodiments may determine that a subsequent vector is a part of a first cluster assigned with the "sensitive data" label based on a first distance between the first vector and a vector of the first cluster and a second distance between the first vector and a vector of a second cluster not assigned with the "sensitive data" label. In response to a determination that the first vector is part of the first cluster, some embodiments may associate the first vector with the "sensitive data" label. Similarly, some embodiments may determine that a second vector is not part of the first cluster based on distances between the second vector and vectors of the first and second clusters and, in response, not associate the second vector with the "sensitive data" label. Some embodiments may explicitly associate the second vector with a "non-sensitive data" label, where the "sensitive data" label and "non-sensitive data" label may be mutually exclusive with respect to each other.

In some embodiments, a vector offset subsystem 128 may determine that a candidate token that is known to be associated with a particular label has been determined not to be associated with that label by a machine learning model. For example, the vector offset subsystem 128 may determine that the candidate token "p496re325gk@egrf85aj76.c95" is associated with the label "sensitive data" based on a training dataset while a first machine learning model determined that the candidate token "p496re325gk@egrf85aj76.c95" is not associated with the label "sensitive data." Additionally, some embodiments may use a set of encoder layers to determine the embedding vector "[0.53, 0.99, 0.71, 0.32, 0.45]" based on the candidate token and associate the embedding vector with the "non-sensitive data" label. The training subsystem 128 may detect that the categorization made by the first machine learning model does not match with the categorization for the candidate token in the training data set. For example, some embodiments may then update the label associations of the embedding vector to indicate that the embedding vector is associated with the "sensitive data" label and perturb an embedding vector "[0.1, 0.2, 0.3]" by one or more offset values.

Some embodiments may perturb a vector by randomly adding one or more elements of the embedding vector with a set of randomly determined offset values. For example, some embodiments may generate an offset vector by randomly generating offset values in a range between −0.05 and +0.05 based on an offset parameter $\varepsilon=0.05$, where the boundaries of each element may be equal to $\pm\varepsilon$. Some embodiments may then add the offset vector to a first embedding vector to generate a perturbed vector. Alternatively, or in addition, some embodiments may perturb a vector by randomly multiplying one or more of the elements of the embedding vector by a set of randomly determined values. For example, some embodiments may generate an offset vector by randomly generating elements of the offset vector that range between 0.9 and 1.1 based on an offset parameter $\varepsilon=0.1$, where the boundaries of the range of each element may be equal to the expression "$1.0\pm\varepsilon$". Some embodiments may then determine an element-wise product based on the embedding vector and the offset vector. Various other types of operations may be performed to generate an offset vector, and various other types of operations may be performed to generate a perturbed vector based on an original embedding vector and the offset vector. For example, an element may be exponentiated, factored, squared, or transformed in some other way based on an offset value.

In some embodiments, a decoder subsystem 129 may be used to decode an embedding vector to determine one or more tokens. As described elsewhere in this disclosure, the decoder layer of the decoder subsystem 129 may be provided with an embedding vector to predict a decoded token. In some embodiments, the decoder layers of the decoder subsystem 129 may be provided with an embedding vector and output the same token used to generate the embedding vector with the encoder layers of the encoder subsystem 126. For example, if the candidate token "p496re325gk@egrf85aj76.c95" is used to generate the embedding vector "[0.53, 0.99, 0.71, 0.32, 0.45]," some embodiments may then use a set of decoder layers to output the same token "p496re325gk@egrf85aj76.c95" after providing the set of decoder layers with the vector "[0.53, 0.99, 0.71, 0.32, 0.45]."

Some embodiments may decode embedding vectors that have been perturbed, where one or more elements of the vector may have been altered from their original values. For example, some embodiments may first determine an embedding vector "[0.1, 0.2, 0.3]" by providing the set of encoder layers with a first token "sample_sensitive_data_01," and perturb the embedding vector to generate the perturbed vector "[0.11, 0.21, 0.30]." Some embodiments may then provide the perturbed vector "[0.11, 0.21, 0.30]" to a set of decoder layers to generate the synthesized token "Xample_sensit1ve_dataQ2." After generating the synthesized token, some embodiments may associate the synthesized token with the same data labels as that of the first token. For example, if the first token is associated with the label "sensitive data," some embodiments may associate the synthesized token with the label "sensitive data."

Some embodiments may note specific characters or sequences of characters and require the placement of the specific character or sequences of characters in the synthesized tokens. For example, some embodiments may determine that an input token includes an "@" character, where the "@" character matches with a character set in a set of flagged character sets. Some embodiments may then segment the input token by using the "@" character as a delimiter to generate two or more sub-tokens and generate two or more embedding vectors based on the sub-tokens. Some embodiments may then perform operations to include the "@" character in a synthesized token if the synthesized token does not include the "@" character.

As described elsewhere in this disclosure, some embodiments may use the prediction subsystem 125 to retrain one or more machine learning models based on the tokens generated with use of perturbed vectors. For example, some embodiments may synthesize the token "Xample_sensit1ve_dataQ2" from a perturbed vector using a set of decoder layers and associate the token with the label "sensitive data." Some embodiments may perform a training operation to update weights and biases of a convolutional neural network or another machine learning model used to predict labels for tokens based on the synthesized token "sample_sensitive_data_02" and its corresponding label "sensitive data."

Figure 2:
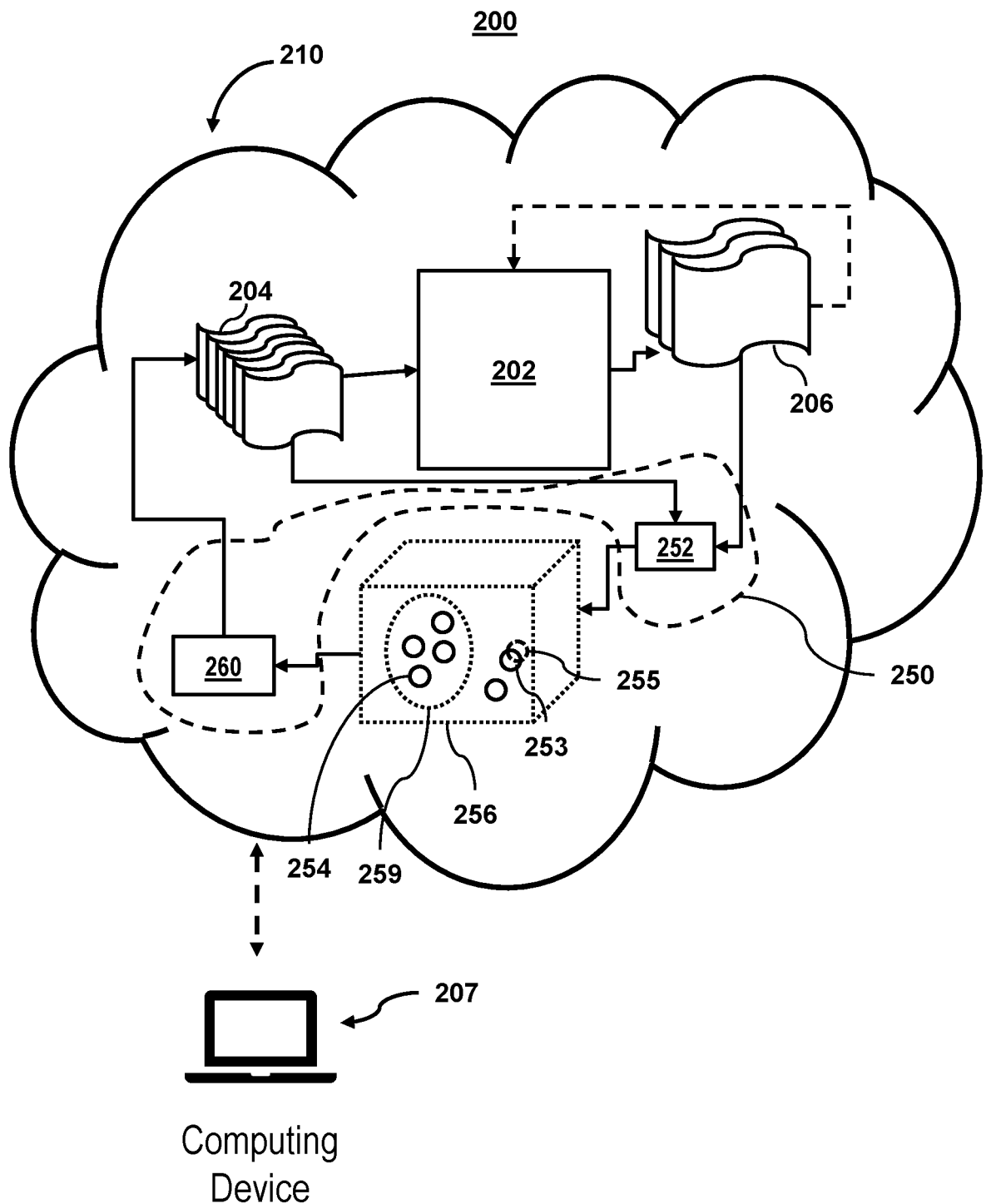
FIG. 2 shows an illustrative diagram of a system for training and using a prediction to assign labels to tokens, in accordance with one or more embodiments.

FIG. 2 shows an illustrative diagram of a system for training and using a prediction to assign labels to tokens, in accordance with one or more embodiments. A system 200 may include computing device 207, where the computing device 207 may be any computing device, including, but not limited to, a smartphone, a laptop computer, etc. FIG. 2 also includes cloud system 210 implemented on a distributed computer system, where the cloud system 210 may include any computing device described in this disclosure or any other type of mobile computing device, fixed computing device, or other computing device. In some embodiments, the distributed computer system may include a set of computing nodes such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the server 120, the network 150, or the set of databases 130. For example, the set of databases 130 may each be controlled by different computing nodes of the set of computing nodes, and a query received by the set of databases 130 may cause each node of the set of computing nodes to perform a search based on the query. For example, some embodiments may send a query to the cloud system 210 to retrieve neural network parameters or other learning model parameters for predicting labels for a token or for determining a vector in a latent space based on the token using a neural network or other learning model.

In some embodiments, the cloud system 210 may include a machine learning model 202. The machine learning model 202 may take inputs 204 and provide outputs 206. The inputs may include multiple datasets, such as a training dataset and a test dataset. For example, some embodiments may obtain tokens from the training set and use the tokens of the training set data as part of the inputs 204. Some embodiments may then use the labels corresponding with the tokens of the training set data as training objectives when training the machine learning model 202. In some embodiments, outputs 206 may include labels generated by the machine learning model 202. Some embodiments may determine loss function results based on matches or mismatches between the outputs 206 and the labels of the training set data and feed these results back to the machine learning model 202 as inputs to train the machine learning model 202.

In some embodiments, the machine learning model 202 may include an artificial neural network. In such embodiments, machine learning model 202 may include an input layer and one or more hidden layers of neural network cells. Each neural network cell of the machine learning model 202 may be connected with many other neural network cells of the machine learning model 202. Such connections can be enforcing or inhibitory in their effect on the activation state of connected neural network cells. In some embodiments, each individual neural network cell may have a summation function that combines the values of all of its inputs. In some embodiments, each connection (or the neural network cell itself) may have a threshold function such that the signal must surpass it before it propagates to other neural network cells. Some embodiments may perform additional operations such as convolving a set of input values using one or more convolutional layers of a convolutional neural network.

In some embodiments, machine learning model 202 may update its learning model parameters (e.g., weights, biases, activation function parameters, memory parameters, or other parameters) based on the outputs 206 and reference feedback information (e.g., user indication of accuracy, reference vectors, or other information). In some embodiments, such as where machine learning model 202 is a neural network, connection weights may be adjusted to reconcile differences between the neural network's prediction and reference feedback. For example, an output layer of the machine learning model 202 may correspond to a category, and a field identifier or field descriptor known to correspond to that classification may be provided to an input layer of the machine learning model 202 during training.

In some embodiments, machine learning model 202 may include multiple layers (e.g., where a signal path traverses from front layers to back layers). In some embodiments, the machine learning model 202 may use backpropagation techniques, where forward stimulation is used to reset weights on the "front" neural network cells. For example, one or more neural network cells (i.e., "neurons," "cells," "neural units") of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition operations for the machine learning model 202 may be more free-flowing, with connections interacting in a more chaotic and complex fashion.

In some embodiments, the cloud system 210 may include an autoencoder 250 that includes a set of encoder layers 252 and a set of decoder layers 260. In some embodiments, the set of decoder layers 260 may include a same number of neural network cells or a same number of neural network layers as the set of encoder layers 252. In some embodiments, the set of encoder layers 252 may include a first layer of neural network cells capable of generating an initial hidden state based on an input token of the inputs 204. Some embodiments may then provide the initial hidden state to a second layer of the set of encoder layers 252. Some embodiments may use the last layer of the neural network cells of the set of encoder layers 252 to generate an output vector in a latent space 256. Some embodiments may then provide the output vector to the set of decoder layers 260 as an input, where a neural network output of the set of decoder layers 260 may be or otherwise include an output token. In some embodiments, the output token may be similar to or the same as the input token used to generate the output vector in the latent space 256.

In some embodiments, the autoencoder 250 may be trained based on an initial training set to minimize a loss function for the initial training set. For example, some embodiments may train the set of encoder layers 252 and the set of decoder layers 260 by providing a training set of tokens to the set of encoder layers 252. Some embodiments may update the weights, biases, or other parameters of the set of encoder layers 252 and set of decoder layers 260 during the training operation such that the set of decoder layers 260 may output the same training set of tokens.

In some embodiments, the set of encoder layers 252 or the set of decoder layers 260 may include recurrent neural network architecture that uses cell memory parameters, such as a forget gate value or a memory cell value, which retain or lose values over time based on inputs. For example, the set of encoder layers 252 and the set of decoder layers 260 may include LSTM cells. During a training operation, some embodiments may use the set of cell memory parameters of the autoencoder 250 to generate an embedding vector as a neural network output of the autoencoder 250, where some embodiments may update the cell memory parameter of the cell based on the embedding vector.

As described elsewhere in this disclosure, some embodiments may provide a training token of the inputs 204 to the set of encoder layers 252, where the training token may be associated with a known label. Some embodiments may use the set of encoder layers 252 to generate a first vector 253 within the latent space 256, where the first vector 253 is not part of a first cluster 259. Furthermore, some embodiments may use the set of encoder layers 252 to generate a second embedding vector 254 within the latent space 256, where the second embedding vector 254 is part of a first cluster 259. Furthermore, while not shown, some embodiments may determine a plurality of clusters in the latent space 256. For example, some embodiments may determine a second cluster using the set of clustering criteria used to determine the first cluster 259.

Some embodiments may use a clustering method and an associated set of clustering criteria based on the latent space 256 to determine the existence of the first cluster 259. In addition, some embodiments may use the set of clustering criteria to determine that the first vector 253 is not part of the first cluster 259. For example, some embodiments may use a density-based clustering algorithm to determine that the first vector 253 is too far from any of the vectors of the first cluster 259 and determine that the first vector 253 is not part of the first cluster 259. Furthermore, some embodiments may generate a visualization of the first cluster 259 and other vectors in the latent space 256. For example, some embodiments may generate a visualization of the vectors in the latent space 256 by depicting a set of points in a multidimensional space, where vectors of different vector sets are represented by points having different colors.

In some embodiments, the first cluster 259 may be associated with a set of labels, such as a label indicating sensitive data. For example, if a second token is used to generate the second embedding vector 254, and if the machine learning model 202 categorizes the second token as sensitive data, some embodiments may associate the second token with a "sensitive data" label. After first associating the first cluster 259 with a "sensitive data" label, some embodiments may associate additional tokens with the "sensitive data" label based on a determination that the vectors generated from the additional tokens are part of the first cluster.

In some embodiments, if a first token is used to generate the first vector 253, and if the machine learning model 202 categorizes the first token as not sensitive data, some embodiments may associate the second token with a "non-sensitive data" label or some other label indicating that the second token is not sensitive. Some embodiments may then detect a mismatch between the indicated non-association with the "sensitive data" label made the machine learning model 202 and a training data association that indicates that the first token is associated with the "sensitive data" label. Based on this detected mismatch, some embodiments may then associate the first vector 253 with the "sensitive data" label. Furthermore, some embodiments may update the boundaries of the first cluster 259 to include the first vector 253.

Some embodiments may then perturb the first vector 253 by modifying one or more elements of the first vector 253 to generate the perturbed vector 255. For example, some embodiments may perturb the first vector 253 by multiplying each element of the first vector 253 by 1.1 to determine the perturbed vector 255. Some embodiments may associate the perturbed vector 255 with the labels associated with the first vector 253 or the first token used to generate the first vector 253. For example, the perturbed vector 255 may be associated with the "sensitive data" label based on a determination that the first vector 253 is associated with the "sensitive data" label in a training dataset.

Some embodiments may then generate a synthesized token by inputting the perturbed vector 255 to the set of decoder layers 260. As described elsewhere in this disclosure, some embodiments may generate synthesized sub-tokens based on different perturbed vectors and concatenate the sub-tokens with one or more flagged character sets to generate a synthesized token. Some embodiments may then provide the synthesized token generated from the perturbed vector 255 to the inputs 204 to retrain the machine learning model 202, where a training objective for the machine learning model 202 is to predict that the synthesized token is associated with the "sensitive data" label.

Figure 3:
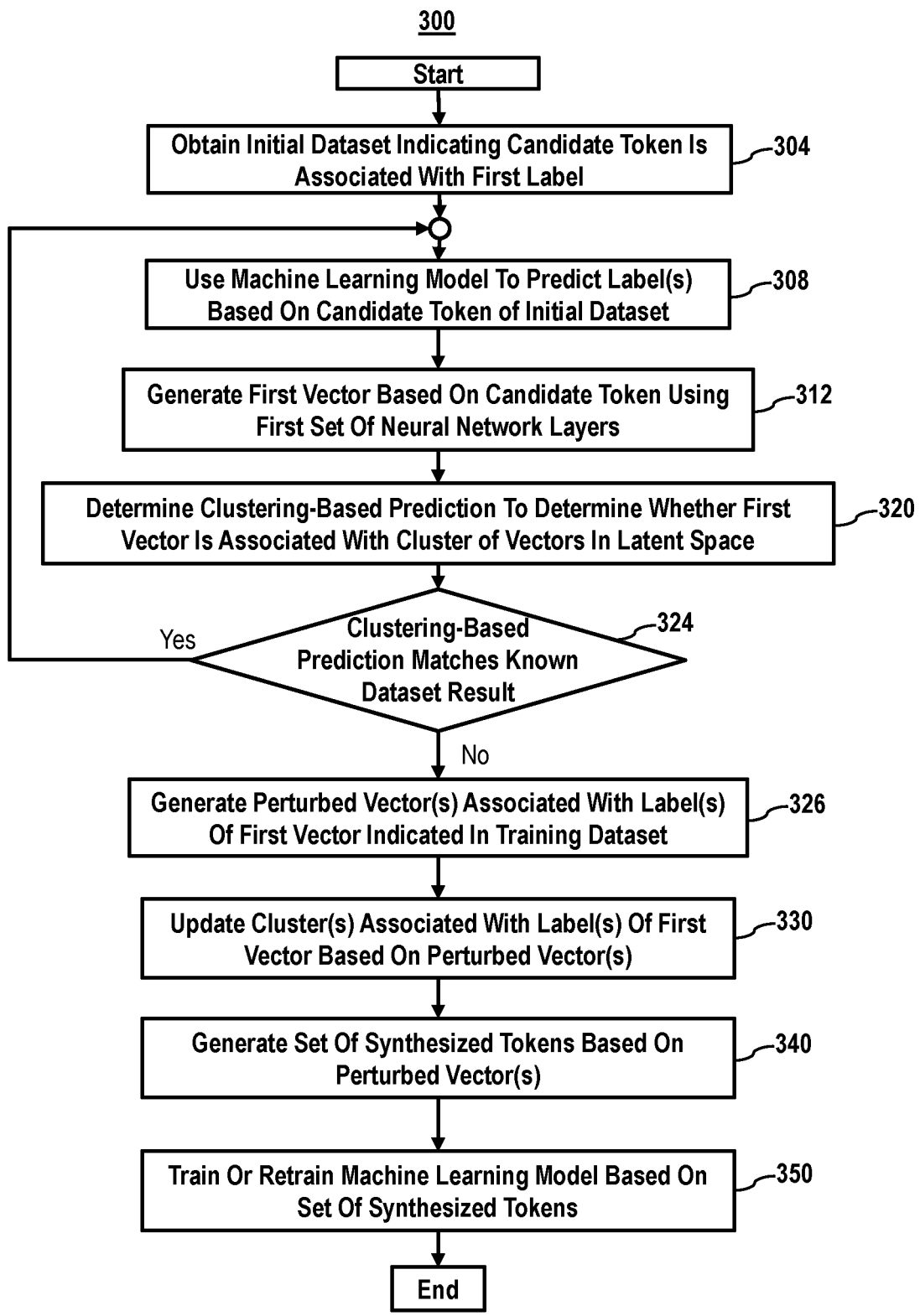
FIG. 3 shows a flowchart of a process to generate tokens and train a learning model based on the tokens, in accordance with one or more embodiments.

FIG. 3 shows a flowchart of a process to generate tokens and train a learning model based on the tokens, in accordance with one or more embodiments. Some embodiments may obtain an initial dataset indicating that a candidate token is associated with a first label, as indicated by block 304. The initial dataset may include a training dataset stored in a database or other collection of records. For example, some embodiments may obtain the initial dataset from a training model database storing a corpus, where the corpus may include multiple documents, sequences of tokens generated from the documents, and labels associated with the tokens. The training model database may include various types of associations between tokens and labels. For example, a training model data set may associate the token "302y-12x-569z" with the label "sensitive data."

Some embodiments may use a first machine learning model to predict a set of labels based on a candidate token of the initial dataset, as indicated by block 308. The first machine learning model may include a model with modifiable parameters that may change a prediction based on the values of the modifiable parameters. Such machine learning models may include a neural network model, a regression model, a random forest model or another type of decision tree model, a support vector machine model, a gradient boosted trees model, etc. For example, the first machine learning model may include a convolutional neural network that includes at least one convolutional layer that includes a convolutional filter, at least one pooling layer, and at least one fully connected layer.

Some embodiments may then provide the first machine learning model with a candidate token obtained from the initial data set, where the candidate token may already be associated with a known set of labels in the initial dataset. For example, some embodiments may provide the first machine learning model with a candidate token "fjkl3.444.0xa," where the candidate token is associated with the label "sensitive data." The first machine learning model may be trained to predict labels for the candidate token, where the first machine learning model may either predict that the candidate token is associated with the label "sensitive data" or may instead predict that the candidate token is not associated with the label "sensitive data."

Some embodiments may generate a first vector based on the candidate token using a first set of neural network layers, or other machine learning model parameters, as indicated by block 312. In some embodiments, the first set of neural network layers may configured based on a first set of neural network layer parameters. Some embodiments may generate the first vector to represent an embedding for an input candidate token by providing the input candidate token to a set of encoder layers of an autoencoder or another sequence-to-sequence neural network to determine the vector. For example, some embodiments may provide the encoder layers of an LSTM autoencoder with a token "fjkl3.444.0xa" to output a first vector in a multidimensional latent space.

Some embodiments may update a set of machine learning model parameters of a neural network by training an autoencoder using a training set that includes a corpus, sequences of tokens generated from documents of the corpus, or labels associated with the tokens. For example, some embodiments may initially configure the autoencoder with a set of randomly determined model parameters. Some embodiments may then train the autoencoder for each token obtained from a corpus. Some embodiments may use the loss function result of a training operation to update one or more model parameters. For example, cells of a set of encoder neural network layers and cells of a set of decoder neural network cells of an autoencoder may include recurrent neural networks that use cell memory parameters, such as a forget gate value or a memory cell value, which retain or lose values over time based on inputs. Some embodiments may use the cell memory parameters of an autoencoder to generate an embedding vector as a first neural network output of the autoencoder and an output token based on the embedding vector. The training may continue until the decoder neural network cells of the autoencoder provide output tokens that match the input tokens within a threshold accuracy range. The accuracy of the matching may be increased by updating the weights, biases, cell memory parameters, or other machine learning model parameters of the encoder or decoder neural network cells.

Some embodiments may retrieve a set of flagged character sets that represent special characters or sequences of characters that should be included in a synthesized token, as described elsewhere in this disclosure. For example, a character set of the set of flagged character sets may include single characters such as the "@" character or another symbol, a punctuation mark, an alphanumeric character, etc. Alternatively, or in addition, the character set may include a sequence of characters (e.g., ".com"). After detecting that a character set of a candidate token matches with a flagged character set of the set of flagged character sets, some embodiments may segment the candidate token into a plurality of sub-tokens based on the character set. Some embodiments may then provide each sub-token of the plurality of sub-tokens to the first set of neural network layers to generate a plurality of vectors. As described elsewhere in this disclosure, some embodiments may then perturb one or more vectors of the plurality of vectors to generate one or more perturbed vectors, where the one or more perturbed vectors may then be used to generate a plurality of synthesized sub-tokens.

Some embodiments may determine a clustering-based prediction to determine whether the first vector is associated with a cluster of vectors in a latent space, as indicated by block 320. A clustering-based prediction may include a prediction about the state or associations of a vector or inputs used to generate the vector. Some embodiments may determine a clustering-based prediction by determining that the first vector is part of a first cluster of vectors in a latent space and associating labels of the first cluster with the first vector, or an input used to generate the first vector. For example, a first cluster may be associated with the sensitive data label, and a determination that a first vector is part of the first cluster may result in a clustering-based prediction that the first vector is associated with the cluster of vectors.

A cluster of vectors and a latent space may be determined using various types of clustering criteria. Clustering criteria may include criteria based on a density-based clustering, hierarchical clustering, centroid-based clustering, distribution-based clustering, fuzzy clustering, etc. For example, some embodiments may determine a cluster in a latent space using density-based clustering, where parameters of the density-based clustering may include a first parameter to indicate a maximum distance between a pair of vectors for the pair of vectors to be a part of the same cluster and a second parameter to indicate a minimum number of vectors needed to form a cluster. Based on a determination that a first vector is within the maximum distance of a second vector, where the second vector is part of a first cluster, some embodiments may determine that the first vector is part of the first cluster. Some embodiments may assign labels or other values to a cluster based on labels or values associated with a vector of the cluster. For example, after determining that a first vector is part of a first cluster, some embodiments may determine that the first vector is associated with the "sensitive data" label. In response, some embodiments may associate the first cluster with the "sensitive data" label.

In some embodiments, an embedding vector may be within a maximum distance threshold of different clusters, where the clusters may be associated with mutually exclusive labels. Some embodiments may determine a first score based on the distances between the embedding vector and vectors of a first cluster and a second score based on distances between the embedding vector and vectors of a second cluster. In some embodiments, the scores may include measures of central tendency of distances, such as a mean average distance or median distance. Alternatively, the scores may include a least distance or greatest distance value of the distances. For example, some embodiments may determine that the least distance between a vector and a first cluster is less than the least distance between the vector and a second cluster and, in response, determine that the vector is a part of the first cluster. Alternatively, or in addition, some embodiments may determine scores for an embedding vector by determining the k closest vectors to the embedding vector in a latent space, where k is an integer. Some embodiments may then determine a first count of vectors of a first cluster associated with a first label and a second count of vectors associated with a second cluster. Based on a determination that the first count is greater than the second count, some embodiments may associate the candidate token with a set of labels associated with the first cluster. Some embodiments may require that the first count is greater than the second count by a certain threshold. For example, some embodiments may require that the first count is greater than the second count by at least one, at least two, at least five, or at least some other number used as a threshold value.

After determining an initial set of labels or other values for a cluster, some embodiments may determine a clustering-based prediction for a subsequent vector based on whether or not the subsequent vector is part of the cluster. For example, some embodiments may determine that a subsequent vector is not part of a first cluster that is associated with the "sensitive data" label. In response, some embodiments may generate a clustering-based prediction indicating that the subsequent vector or a candidate token used to generate the subsequent vector is not associated with the "sensitive data" label (e.g., by being labeled "non-sensitive data.").

Some embodiments may determine whether the clustering-based prediction matches a known data set result, as indicated by block 324. Some embodiments may determine whether a set of labels associated with a candidate token by a clustering-based prediction matches with the label associated with the candidate token in a training set. For example, some embodiments may determine a clustering-based prediction that indicates that a candidate token is not associated with the "sensitive data" label, where a training data set may indicate that the candidate token is associated with the "sensitive data" label. In response to a determination that the clustering-based prediction matches with the associations indicated by the training set, operations of the process 300 may return to block 308 to process a new candidate token. Otherwise, operations of the process 300 may proceed to block 326.

Some embodiments may generate a set of perturbed vectors associated with a set of labels based on the generated vector and a set of offset parameters, as indicated by block 326. In some embodiments, the set of labels may be or include a sensitive data label. Some embodiments may generate a perturbed vector based on a set of offset values, such as by multiplying elements of the perturbed vector by the set of offset values. Some embodiments may determine an offset value based on an offset parameter, where the offset parameter may be stored as a default value or may be retrieved from a user interface field. For example, some embodiments may determine an offset value by randomly or pseudo-randomly generating a random value between a range set by the offset parameter. Some embodiments may determine an offset value as the value between zero and the offset parameter. Alternatively, some embodiments may determine an offset value as a value between 1.0±the offset parameter. Some embodiments may determine a perturbed vector by determining a sum based on an initial element of an embedding vector and the offset value (e.g., adding or subtracting an element of an embedding vector by the offset value). Furthermore, some embodiments may obtain a plurality of vectors corresponding with a plurality of sub-tokens. Some embodiments may perturb some or all of the plurality of vectors to generate a set of perturbed vectors, where each respective perturbed vector of the set of perturbed vectors is associated with a respective sub-token.

As described elsewhere in this disclosure, some embodiments may update the offset parameter based on a first distance between a vector generated from a candidate token associated with a first label and a vector of a cluster associated with the first label. For example, some embodiments may determine a maximum distance in the latent space based on an embedding vector [1, 1, 1] by determining a set of maximum quantitative changes to the embedding vector based on the offset parameter 0.1 to generate a perturbed vector [1.1, 1.1, 1.1]. Some embodiments may then determine the distance between the embedding vector and the perturbed vector to determine that the maximum distance is approximately 0.17 in the latent space. In response to a determination that the maximum distance is less than the computed distance, some embodiments may update the offset parameter such that the maximum distance is increased. For example, some embodiments may determine that a first distance between an embedding vector associated with a first label and the closest vector of the cluster associated with the first label is equal to 0.2, where the maximum distance based on an offset parameter is equal to 0.17. Based on a determination that the first distance is greater than the maximum distance, some embodiments may increase the offset parameter such that the maximum distance is equal to or greater than the first distance.

Some embodiments may update one or more clusters associated with the set of labels based on the set of perturbed vectors, as indicated by block 330. After determining a synthesized vector based on an embedding vector, some embodiments may update a cluster to include the synthesized vector. For example, some embodiments may update a cluster of vectors associated with a first label to include a synthesized vector, where the first label may be a sensitive data label. Alternatively, based on a determination that the distance between the synthesized vector and a cluster of vectors associated with the second label is greater than a maximum distance threshold, some embodiments may generate a new cluster that includes the synthesized vector, where the new cluster is associated with a second label.

Some embodiments may generate a plurality of perturbed vectors based on an embedding vector. For example, some embodiments may iteratively or concurrently modify one or more elements of an embedding vector to generate three different perturbed vectors, where each of the perturbed vectors is within a threshold distance of the embedding vector in a latent space. Each of the different perturbed vectors may be incorporated in a cluster of vectors associated with one or more labels associated with the token used to generate the embedding vector. Furthermore, as described elsewhere in this disclosure, some embodiments may generate perturbed vectors based on embedding vectors of sub-tokens representing portions of a token.

Some embodiments may generate additional clusters based on a set of perturbed vectors. For example, some embodiments may generate a plurality of perturbed vectors associated with a set of labels if a candidate token associated with the set of labels in a training set is used to generate the first vector using a set of encoder layers. Some embodiments may then generate a new cluster based on the candidate token and the plurality of perturbed tokens. Alternatively, or in addition, some embodiments may expand the boundaries of an existing cluster associated with the first label. For example, some embodiments may expand the boundaries of a cluster associated with a "sensitive data label" by adding a perturbed vector to the cluster.

Some embodiments may generate visualizations based on the vectors or clusters of vectors described in this disclosure. For example, some embodiments may depict a set of embedding vectors in a multidimensional space by drawing points on a multidimensional user interface. In some embodiments, the set of dimensions may be greater than three and, in response, some embodiments may reduce the dimensionality of vectors to visualize the vectors in a reduced-dimensional form. Alternatively, some embodiments may truncate the number of elements in a vector to display point representing the vectors.

Some embodiments may generate a set of synthesized tokens based on the set of perturbed vectors, as indicated by block 340. Some embodiments may provide the perturbed tokens generated using operations described in this disclosure to a set of neural network layers, such as a set of decoder layers of an autoencoder to generate a synthesized token. For example, after receiving a candidate token "3739.I/O," some embodiments may use a set of encoder layers of an autoencoder to generate an embedding vector "[0.04, 0.91, 0.46]." Some embodiments may then determine a clustering-based prediction based on the embedding vector and a first cluster, where the clustering-based prediction indicates that a first set of labels is associated with the candidate token. After perturbing the embedding vector based on an offset parameter 0.1, some embodiments may multiply each of the elements of the embedding vector by a randomly generated value ranging between one±the offset parameter. For example, some embodiments may determine a perturbed vector by performing an element-wise multiplication of the embedding vector and an offset vector [0.95, 0.99, 1.05] to determine the perturbed vector [0.038, 0.9009, 0.483]. Some embodiments may then provide the perturbed vector to a set of decoder layers of the autoencoder to generate a synthesized token "3710x.I/O."

Some embodiments may generate a plurality of synthesized tokens based on a plurality of perturbed vectors. For example, after determining a first perturbed vector "[0.91, 0.92, 0.93]" and "[0.93, 0.94, 0.89]" from an embedding vector "[0.90, 0.90, 0.90]," where the embedding vector may be generated from the candidate token "4x1-64a-5606," some embodiments may generate a first synthesized token "4y1-64b-5601" and a second synthesized token "05a-001-abcd," respectively. Some embodiments may then associate the first and second synthesized token with the same set of labels as the candidate token. Furthermore, as described elsewhere in this disclosure, after generating a plurality of perturbed vectors corresponding with sub-tokens of a token, some embodiments may generate a synthesized sub-token for each vector of the plurality of perturbed vectors. For example, some embodiments may determine that a token "j1l2(o)i0z" includes a flagged character set "(o)" and segment the token into sub-tokens "j1l2" and "i0z." Some embodiments may then determine an embedding vector and corresponding perturbed vector for each of the sub-tokens using operations described in this disclosure. Some embodiments may then provide the corresponding perturbed vectors to a set of decoder layers to generate the synthesized sub-tokens "016z" and "bl0" and concatenate the sub-tokens with the flagged character set "(o)" to form the synthesized token "016z(o)bl0."

Some embodiments may train or retrain the machine learning model based on the set of synthesized tokens, as indicated by block 350. As described elsewhere in this disclosure, some embodiments may use a machine learning model to predict one or more labels for a token or sequence of tokens. Some embodiments may then update learning model parameters of the machine learning model by training the machine learning model with the synthesized tokens, and their associated labels. For example, after generating the synthesized token "444" and associating the synthesized token with a "sensitive data" label, some embodiments may train a convolutional neural network to assign the label "sensitive data" to the synthesized token. Once the machine learning model is retrained, the machine learning model may associate a previously used candidate token with one or more labels that would not have been associated with the previously used candidate token before the retraining operation. Furthermore, some embodiments may repeat one or more operations described above for subsequent tokens.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or in addition, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or LTE network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-129 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 124-129 described herein is for illustrative purposes, and is not intended to be limiting, as any of subsystems 124-129 may provide more or less functionality than is described. For example, one or more of subsystems 124-129 may be eliminated, and some or all of its functionality may be provided by other ones of subsystems 124-129. As another example, additional subsystems may be programmed to perform some or all of the functionality attributed herein to one of subsystems 124-129.

With respect to the components of computing devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, indicated otherwise, updating an item may include generating the item or modifying an existing time. Thus, updating a record may include generating a record or modifying the value of already-generated value.

ENUMERATED EMBODIMENTS

The present techniques will be better understood with reference to the following enumerated embodiments:

1. A method comprising: generating a first vector associated with a token using a first set of parameters of a first machine learning model based on the token; determining a prediction indicating that the token is associated with a first label based on a set of clustering criteria, the first vector, vectors of a first vector set in a latent space associated with the first label, and vectors of a second vector set in the latent space associated with a second label; in response to a determination that the prediction indicates that the token is associated with the first label, generating a perturbed vector associated with the second label by modifying a value of the first vector; updating the second vector set to comprise the perturbed vector; generating a synthesized token associated with the second vector set based on the perturbed vector using a second set of parameters of the first machine learning model; and training a second machine learning model based on the synthesized token.
2. The method of claim 1, wherein the token is associated with a second label in a dataset
3. The method of any of claims 1 to 2, wherein applying the set of clustering criteria to the first vector and the perturbed vector indicates that the token is associated with the second label
4. A method comprising: generating a first vector in a latent space associated with a token using a first set of neural network layers based on the token; determining a prediction indicating that the token is associated with a first label based on a set of clustering criteria, the first vector, a first vector set associated with the first label, and a second vector set associated with a second label, wherein the token is associated with the second label in a dataset, and wherein the first and second labels are mutually exclusive with respect to each other; in response to a determination that the prediction does not match the association between the token and the second label stored in the dataset, generating a perturbed vector associated with the second label by modifying a value of the first vector based on an offset parameter; updating the second vector set to comprise the perturbed vector, wherein applying the set of clustering criteria to the first vector and the perturbed vector indicates that the token is associated with the second label; generating a synthesized token associated with the second vector set based on the perturbed vector using a second set of neural network layers; and training a machine learning model based on the synthesized token.
5. A method for training a classification method to recognize sensitive data by perturbing vectors in a latent space representing sensitive data comprising: obtaining, from a neural network, a network-based prediction indicating that a candidate token associated with a sensitive data label should have a non-sensitive data label; encoding, using an encoder layer of an autoencoder, the candidate token to generate a first vector associated with the candidate token; determining a clustering-based prediction by applying a set of clustering criteria to first distances between the first vector and vectors of a non-sensitive label set in a latent space and second distances between the first vector and vectors of a sensitive label set in the latent space, the clustering-based prediction indicating that the candidate token should have the non-sensitive data label; in response to the clustering-based prediction not matching the sensitive data label associated with the candidate token, generating perturbed vectors associated with the sensitive data label that are similar to the first vector by randomly selecting multiple values of the first vector for each of the perturbed vectors and applying a random threshold-restricted offset to each of the selected multiple values; updating the sensitive label set to comprise the perturbed vectors, wherein applying the set of clustering criteria to the first distances and distances between the first vector and the perturbed vectors indicates that the candidate token is associated with the sensitive data label; decoding, with a decoder layer of the autoencoder, the perturbed vectors to generate synthesized sensitive tokens associated with the sensitive label set; and retraining the neural network based on the synthesized sensitive tokens, wherein the neural network associates the candidate token with the sensitive data label after the retraining.
6. The method of any of claims 1 to 5, further comprising: in response to detecting that the candidate token is not matched with the sensitive data label, determining a subset of vectors that are closest to the first vector in the latent space; decoding, with the decoder layer, the subset of vectors to determine a subset of tokens; and storing the subset of tokens in memory in association with the clustering-based prediction.
7. The method of any of claims 1 to 6, further comprising: obtaining a subsequent token after updating the sensitive label set to comprise the perturbed vectors; determining a second vector based on the subsequent token using the encoder layer; determining a first score based on distances between the second vector and the non-sensitive label set; determining a second score based on distances between the second vector and the sensitive label set, wherein the least distance between the second vector and the sensitive label set is a distance between the second vector and a vector of the perturbed vectors; associating the subsequent token with the sensitive data label based on the first and second scores; and displaying an association between the second vector and the first vector on a user interface based on a determination that the perturbed vector is generated from the first vector.

8. The method of any of claims 1 to 7, wherein determining the clustering-based prediction indicating that the candidate token is associated with the non-sensitive data label comprises: determining a first score based on a count of vectors in the non-sensitive label set in the k closest vectors to the first vector, wherein k is an integer; determining a second score based on a count of vectors in the sensitive label set in the k closest vectors to the first vector; and associating the candidate token with the non-sensitive data label based on a determination that the first score is greater than the second score by a certain threshold.

9. The method of any of claims 1 to 8, wherein the perturbed vector is a first perturbed vector, the method further comprising: obtaining a set of flagged character sets; detecting that a character set of the token matches with a flagged character set of the set of flagged character sets; segmenting the token into a plurality of sub-tokens based on the character set, wherein: generating the perturbed vector comprises generating the first perturbed vector based on a first sub-token of the plurality of sub-tokens and generating a second perturbed vector based on a second sub-token of the plurality of sub-tokens; and generating the synthesized token comprises: generating a first synthesized sub-token based on the first sub-token; generating a second synthesized sub-token based on the second sub-token; and generating the synthesized token by concatenating the first synthesized sub-token, the character set, and the second sub-token.

10. The method of any of claims 1 to 9, the method further comprising: providing a second vector of the first vector set to the machine learning model to determine that the first label is associated with the second vector; and associating the first vector set with the first label.

11. The method of any of claims 1 to 10, the method further comprising displaying a first point representing the first vector, first group of points representing the first vector set, and a second group of points representing the second vector set on a user interface, wherein: the first group of points is depicted with a first color; the second group of points is shown in a second color different from the first color; and the first point is shown in a third color, wherein the first point is closest to the first group of points.

12. The method of any of claims 1 to 11, the method further comprising: storing a first set of model parameters for the machine learning model before the training of the machine learning model; storing a second set of model parameters for the machine learning model after the training of the machine learning model; determining that a rule indicates that a second token is associated with the first label; providing the second token to the machine learning model using the first set of model parameters to determine a first learning model result indicating that the second token is associated with the first label; and providing the second token to the machine learning model using the first set of model parameters to determine a second learning model result indicating that the second token is associated with the second label.

13. The method of any of claims 1 to 12, wherein determining the prediction comprises: obtaining a maximum distance parameter; determining whether a distance between the first vector and a vector of the first vector set in the latent space is less than the maximum distance parameter; and based on a determination that the distance between the first vector and the vector of the first vector set in the latent space is less than the maximum distance parameter, associating the first vector with the first label.

14. The method of any of claims 1 to 13, wherein training the machine learning model comprises providing the perturbed vector to a neural network layer of the machine learning model.

15. The method of any of claims 1 to 14, wherein the machine learning model is a convolutional neural network.

16. The method of any of claims 1 to 15, wherein the machine learning model is a random forest model.

17. The method of any of claims 1 to 16, wherein modifying the value of the first vector comprises modifying the value based on an offset parameter, the method further comprising: determining a first distance between the first vector and a second vector of the second vector set in the latent space; determining a maximum distance from the second vector in the latent space based on the offset parameter; and in response to a determination that the maximum distance is less than the first distance, updating the offset parameter based on the first distance.

18. The method of any of claims 1 to 17, the method further comprising: determining that a distance between the perturbed vector and a second vector of the second vector set does not satisfy a distance threshold; identifying a new cluster based on the perturbed vector, wherein the new cluster comprises the first vector and the perturbed vector; generating an additional vector based on the additional token using the first set of parameters of the first machine learning model; determining whether the new cluster comprises the additional vector based on the set of clustering criteria and a distance between the additional vector and the perturbed vector; and associating the additional token with the second label based on a determination that the new cluster comprises the additional vector.

19. The method of any of claims 1 to 18, wherein generating the perturbed vector comprises: obtaining an offset parameter; randomly or pseudo-randomly determining an offset based on the offset parameter; and determining a sum based on the offset and the value of the first vector, wherein the perturbed vector comprises the sum.

20. The method of any of claims 1 to 19, wherein the offset is less than 0.1.

21. The method of any of claims 1 to 20, wherein generating the perturbed vector comprises: obtaining an offset parameter; randomly or pseudo-randomly determining an offset value based on the offset parameter; and determining a product based on the offset value and the value of the first vector, wherein the perturbed vector comprises the product.

22. The method of any of claims 1 to 21, further comprising: obtaining a user identifier, wherein training the second machine learning model comprises updating values stored in association with the user identifier; and obtaining the first set of parameters from a record associated with the user identifier.

23. One or more tangible, non-transitory, machine-readable media storing instructions that, when executed by one or more processors, effectuation operations comprising those of any of embodiments 1-22.

24. A system comprising: one or more processors; and memory storing computer program instructions that, when executed by the one or more processors, cause the one or more processors to effectuate operations comprising those of any of embodiments 1-22.

What is claimed is:

1. A method for training a classification system to recognize sensitive data by perturbing vectors in a latent space representing sensitive data comprising:

obtaining, from a neural network, a network-based prediction indicating that a candidate token associated with a sensitive data label should have a non-sensitive data label;

encoding, using an encoder layer of an autoencoder, the candidate token to generate a first vector associated with the candidate token;

determining a clustering-based prediction by applying a set of clustering criteria to first distances between the first vector and vectors of a non-sensitive label set in a latent space and second distances between the first vector and vectors of a sensitive label set in the latent space, the clustering-based prediction indicating that the candidate token should have the non-sensitive data label;

in response to the clustering-based prediction not matching the sensitive data label associated with the candidate token, generating perturbed vectors associated with the sensitive data label that are similar to the first vector by randomly selecting multiple values of the first vector for each of the perturbed vectors and applying a random threshold-restricted offset to each of the selected multiple values;

updating the sensitive label set to comprise the perturbed vectors, wherein applying the set of clustering criteria to the first distances and distances between the first vector and the perturbed vectors indicates that the candidate token is associated with the sensitive data label;

decoding, with a decoder layer of the autoencoder, the perturbed vectors to generate synthesized sensitive tokens associated with the sensitive label set; and retraining the neural network based on the synthesized sensitive tokens, wherein the neural network associates the candidate token with the sensitive data label after the retraining.

2. The method of claim 1, further comprising:

in response to detecting that the candidate token is not matched with the sensitive data label, determining a subset of vectors that are closest to the first vector in the latent space;

decoding, with the decoder layer, the subset of vectors to determine a subset of tokens; and storing the subset of tokens in memory in association with the clustering-based prediction.

3. The method of claim 1, further comprising:

obtaining a subsequent token after updating the sensitive label set to comprise the perturbed vectors;

determining a second vector based on the subsequent token using the encoder layer;

determining a first score based on distances between the second vector and the non-sensitive label set;

determining a second score based on distances between the second vector and the sensitive label set, wherein the least distance between the second vector and the sensitive label set is a distance between the second vector and a vector of the perturbed vectors;

associating the subsequent token with the sensitive data label based on the first and second scores; and displaying an association between the second vector and the first vector on a user interface based on a determination that the perturbed vector is generated from the first vector.

4. The method of claim 1, wherein determining the clustering-based prediction indicating that the candidate token is associated with the non-sensitive data label comprises:

determining a first score based on a count of vectors in the non-sensitive label set in the k closest vectors to the first vector, wherein k is an integer;

determining a second score based on a count of vectors in the sensitive label set in the k closest vectors to the first vector; and associating the candidate token with the non-sensitive data label based on a determination that the first score is greater than the second score by a certain threshold.

5. One or more tangible, non-transitory, machine-readable media storing instructions that, when executed by one or more processors, effectuate operations comprising:

generating a first vector in a latent space associated with a token using a first set of neural network layers based on the token;

determining a prediction indicating that the token is associated with a first label based on a set of clustering criteria, the first vector, a first vector set associated with the first label, and the second vector set associated with a second label, wherein the token is associated with the second label in a dataset, and wherein the first and second labels are mutually exclusive with respect to each other;

in response to a determination that the prediction does not match the association between the token and the second label stored in the dataset, generating a perturbed vector associated with the second label by modifying a value of the first vector based on an offset parameter;

updating the second vector set to comprise the perturbed vector, wherein applying the set of clustering criteria to the first vector and the perturbed vector indicates that the token is associated with the second label;

generating a synthesized token associated with the second vector set based on the perturbed vector using a second set of neural network layers; and training a machine learning model based on the synthesized token.

6. The one or more tangible, non-transitory, machine-readable media of claim 5, wherein the perturbed vector is a first perturbed vector, the operations further comprising:

obtaining a set of flagged character sets;

detecting that a character set of the token matches with a flagged character set of the set of flagged character sets;

segmenting the token into a plurality of sub-tokens based on the character set, wherein:

generating the perturbed vector comprises generating the first perturbed vector based on a first sub-token of the plurality of sub-tokens and generating a second perturbed vector based on a second sub-token of the plurality of sub-tokens; and generating the synthesized token comprises:

generating a first synthesized sub-token based on the first sub-token;

generating a second synthesized sub-token based on the second sub-token; and generating the synthesized token by concatenating the first synthesized sub-token, the character set, and the second sub-token.

7. The one or more tangible, non-transitory, machine-readable media of claim 5, the operations further comprising:
providing a second vector of the first vector set to the machine learning model to determine that the first label is associated with the second vector; and
associating the first vector set with the first label.

8. The one or more tangible, non-transitory, machine-readable media of claim 5, the operations further comprising displaying a first point representing the first vector, first group of points representing the first vector set, and a second group of points representing the second vector set on a user interface, wherein:
the first group of points is depicted with a first color;
the second group of points is shown in a second color different from the first color; and
the first point is shown in a third color, wherein the first point is closest to the first group of points.

9. The one or more tangible, non-transitory, machine-readable media of claim 5, the operations further comprising:
storing a first set of model parameters for the machine learning model before the training of the machine learning model;
storing a second set of model parameters for the machine learning model after the training of the machine learning model;
determining that a rule indicates that a second token is associated with the first label;
providing the second token to the machine learning model using the first set of model parameters to determine a first learning model result indicating that the second token is associated with the first label; and
providing the second token to the machine learning model using the first set of model parameters to determine a second learning model result indicating that the second token is associated with the second label.

10. The one or more tangible, non-transitory, machine-readable media of claim 5, wherein determining the prediction comprises:
obtaining a maximum distance parameter;
determining whether a distance between the first vector and a vector of the first vector set in the latent space is less than the maximum distance parameter; and
based on a determination that the distance between the first vector and the vector of the first vector set in the latent space is less than the maximum distance parameter, associating the first vector with the first label.

11. The one or more tangible, non-transitory, machine-readable media of claim 5, wherein training the machine learning model comprises providing the perturbed vector to a neural network layer of the machine learning model.

12. The one or more tangible, non-transitory, machine-readable media of claim 5, wherein the machine learning model is a convolutional neural network.

13. The one or more tangible, non-transitory, machine-readable media of claim 5, wherein the machine learning model is a random forest model.

14. A system comprising:
one or more processors; and
memory storing computer program instructions that, when executed by the one or more processors, cause the one or more processors to effectuate operations comprising:
generating a first vector associated with a token using a first set of parameters of a first machine learning model based on the token;
determining a prediction indicating that the token is associated with a first label based on a set of clustering criteria, the first vector, vectors of a first vector set in a latent space associated with the first label, and vectors of a second vector set in the latent space associated with a second label, wherein the token is associated with the second label in a dataset;
in response to a determination that the prediction indicates that the token is associated with the first label, generating a perturbed vector associated with the second label by modifying a value of the first vector;
updating the second vector set to comprise the perturbed vector, wherein applying the set of clustering criteria to the first vector and the perturbed vector indicates that the token is associated with the second label;
generating a synthesized token associated with the second vector set based on the perturbed vector using a second set of parameters of the first machine learning model; and
training a second machine learning model based on the synthesized token.

15. The system of claim 14, wherein modifying the value of the first vector comprises modifying the value based on an offset parameter, the operations further comprising:
determining a first distance between the first vector and a second vector of the second vector set in the latent space;
determining a maximum distance from the second vector in the latent space based on the offset parameter; and
in response to a determination that the maximum distance is less than the first distance, updating the offset parameter based on the first distance.

16. The system of claim 14, the operations further comprising:
determining that a distance between the perturbed vector and a second vector of the second vector set does not satisfy a distance threshold;
identifying a new cluster based on the perturbed vector, wherein the new cluster comprises the first vector and the perturbed vector;
generating an additional vector based on an additional token using the first set of parameters of the first machine learning model;
determining whether the new cluster comprises the additional vector based on the set of clustering criteria and a distance between the additional vector and the perturbed vector; and
associating the additional token with the second label based on a determination that the new cluster comprises the additional vector.

17. The system of claim 14, wherein generating the perturbed vector comprises:
obtaining an offset parameter;
randomly or pseudo-randomly determining an offset based on the offset parameter; and
determining a sum based on the offset and the value of the first vector, wherein the perturbed vector comprises the sum.

18. The system of claim 17, wherein the offset is less than 0.1.

19. The system of claim 14, wherein generating the perturbed vector comprises:

obtaining an offset parameter;
randomly or pseudo-randomly determining an offset value based on the offset parameter; and
determining a product based on the offset value and the value of the first vector, wherein the perturbed vector comprises the product.

20. The system of claim 14, further comprising:
obtaining a user identifier, wherein training the second machine learning model comprises updating values stored in association with the user identifier; and
obtaining the first set of parameters from a record associated with the user identifier.

\* \* \* \* \*